(12) United States Patent
Lee et al.

(10) Patent No.: US 10,289,717 B2
(45) Date of Patent: May 14, 2019

(54) SEMANTIC SEARCH APPARATUS AND METHOD USING MOBILE TERMINAL

(71) Applicant: INDUSTRY-ACADEMIC COOPERATION FOUNDATION, YONSEI UNIVERSITY, Seoul (KR)

(72) Inventors: Kyong Ho Lee, Seoul (KR); Min Jae Song, Seoul (KR); Sang Jin Shin, Seoul (KR); Sung Kwang Eom, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 560 days.

(21) Appl. No.: 15/016,213

(22) Filed: Feb. 4, 2016

(65) Prior Publication Data

US 2016/0275196 A1    Sep. 22, 2016

(30) Foreign Application Priority Data

Mar. 18, 2015  (KR) .................. 10-2015-0037336

(51) Int. Cl.
*G06F 17/30* (2006.01)

(52) U.S. Cl.
CPC .... *G06F 17/3043* (2013.01); *G06F 17/30672* (2013.01)

(58) Field of Classification Search
CPC ......... G06F 17/30654; G06F 17/30684; G06F 17/30401; G06F 17/3043; G06F 17/30616; G06F 17/30864; G06F 17/30958; G06F 17/30451; G06F 17/30625; G06F 17/30663; G06F 17/30675; G06F 17/2785; G06F 17/277; G06F 17/28; G10L 15/1822
USPC ................ 707/769, E17.015, 760, E17.014, 707/E17.078, E17.087, E17.099, 706, 707/771; 704/9, 10, 4
See application file for complete search history.

(56) References Cited

U.S. PATENT DOCUMENTS

| | | | | |
|---|---|---|---|---|
| 6,601,026 | B2 * | 7/2003 | Appelt | G06F 17/30616 704/9 |
| 7,805,303 | B2 * | 9/2010 | Sugihara | G06F 17/2785 704/257 |
| 8,799,275 | B2 * | 8/2014 | Peng | G06F 17/30867 707/723 |
| 9,020,810 | B2 * | 4/2015 | Gliozzo | G06F 17/2785 704/10 |
| 2006/0248045 | A1 * | 11/2006 | Toledano | G06F 17/30463 |
| 2008/0243811 | A1 * | 10/2008 | He | G06F 17/30616 |

(Continued)

OTHER PUBLICATIONS

Kyong-Ho Lee et al.; "Keyword Based Semantic Search for Mobile Data"; 2014 IEEE (Year: 2014).*

*Primary Examiner* — Dennis Truong

(57) ABSTRACT

Disclosed are an apparatus and a method of searching for information by a mobile device. The present invention provides simplified ontology to be applicable to a mobile environment having a limited resource, and provides ontology capable of providing a combined search environment by combining DBs used by various applications within a mobile device, respectively. Further, the present invention provides a semantic search engine providing a function of searching a local database within a mobile device, and expanding a search to a web as necessary and performing the search.

15 Claims, 9 Drawing Sheets

(56) References Cited

U.S. PATENT DOCUMENTS

| | | | |
|---|---|---|---|
| 2011/0060733 A1* | 3/2011 | Peng | G06F 17/30867 707/723 |
| 2011/0238693 A1* | 9/2011 | Seok | H04M 1/27455 707/769 |
| 2011/0320187 A1* | 12/2011 | Motik | G06F 17/278 704/9 |
| 2013/0080461 A1* | 3/2013 | Byrne | G06F 17/30654 707/769 |
| 2013/0262501 A1* | 10/2013 | Kuchmann-Beauger | G06F 17/30958 707/769 |
| 2013/0346398 A1* | 12/2013 | L'Archeveque | G06F 17/30941 707/722 |
| 2014/0059030 A1* | 2/2014 | Hakkani-Tur | G06F 17/30663 707/706 |
| 2014/0136183 A1* | 5/2014 | Hebert | G06F 17/30654 704/9 |
| 2014/0188935 A1* | 7/2014 | Vee | G06F 17/3043 707/771 |
| 2014/0236579 A1* | 8/2014 | Kurz | G06F 17/28 704/9 |
| 2014/0365518 A1* | 12/2014 | Calo | G06F 17/30401 707/760 |
| 2016/0203130 A1* | 7/2016 | Roque | G06F 17/30684 707/741 |

\* cited by examiner

[FIG. 1]
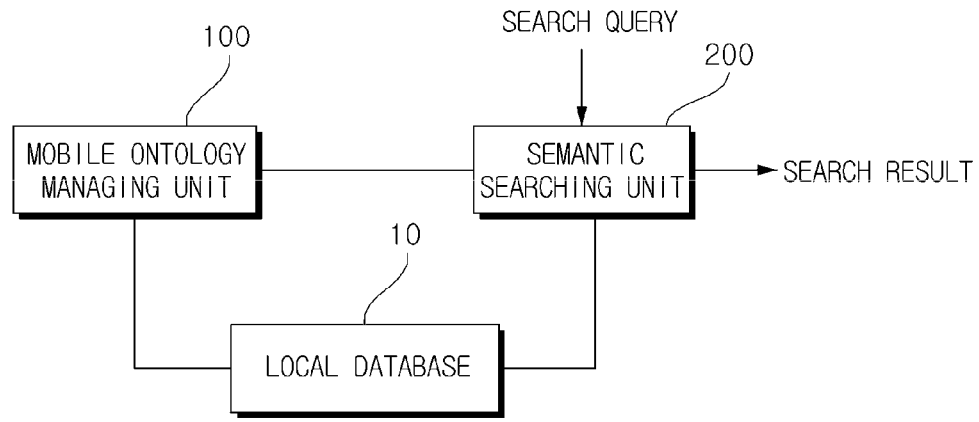
[FIG. 2]
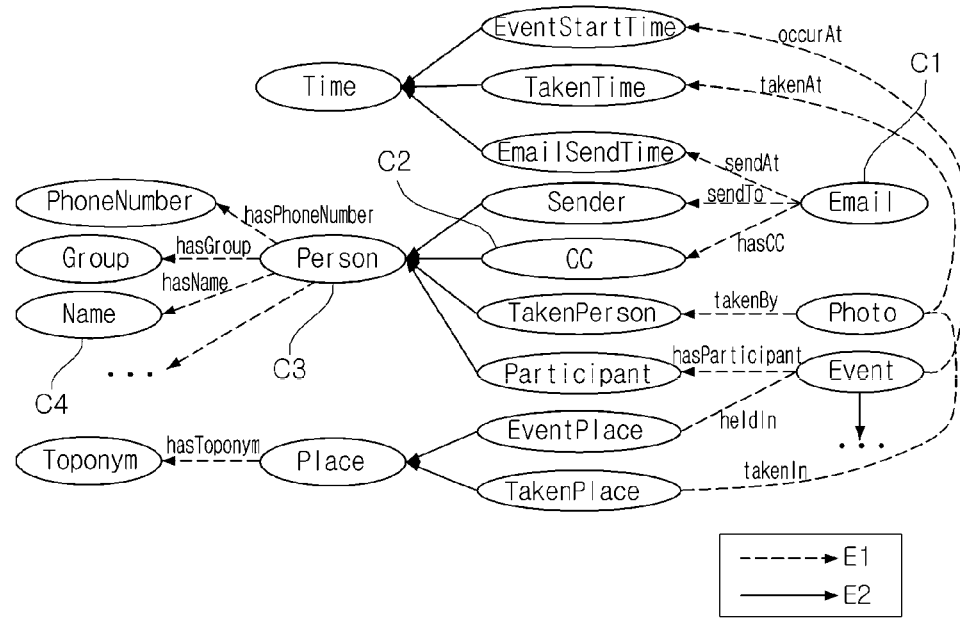

[FIG. 3]
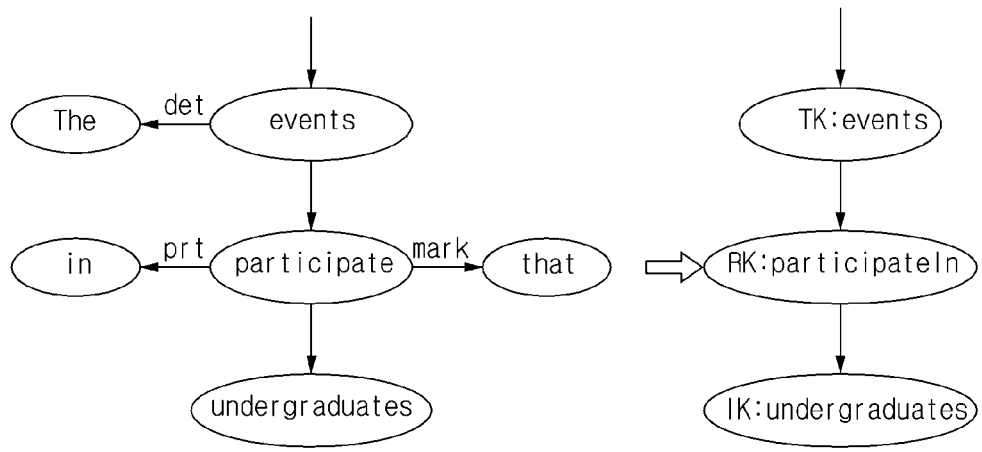
[FIG. 4]
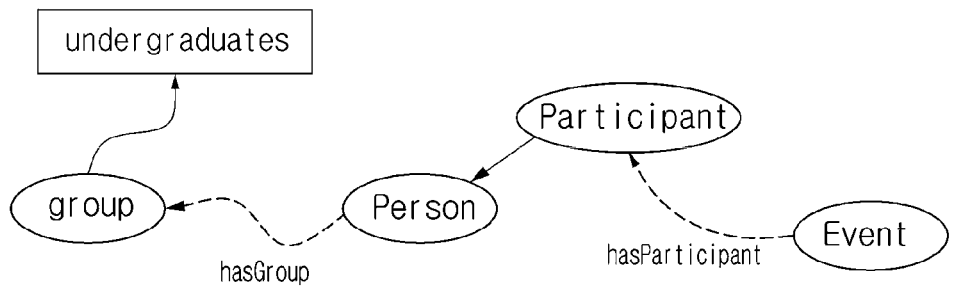

[FIG. 5]

```
SELECT Event
FROM   Event
WHERE  Participant in { SELECT Person
                        FROM   Person
                        WHERE  Group=="undergraduates"}
```

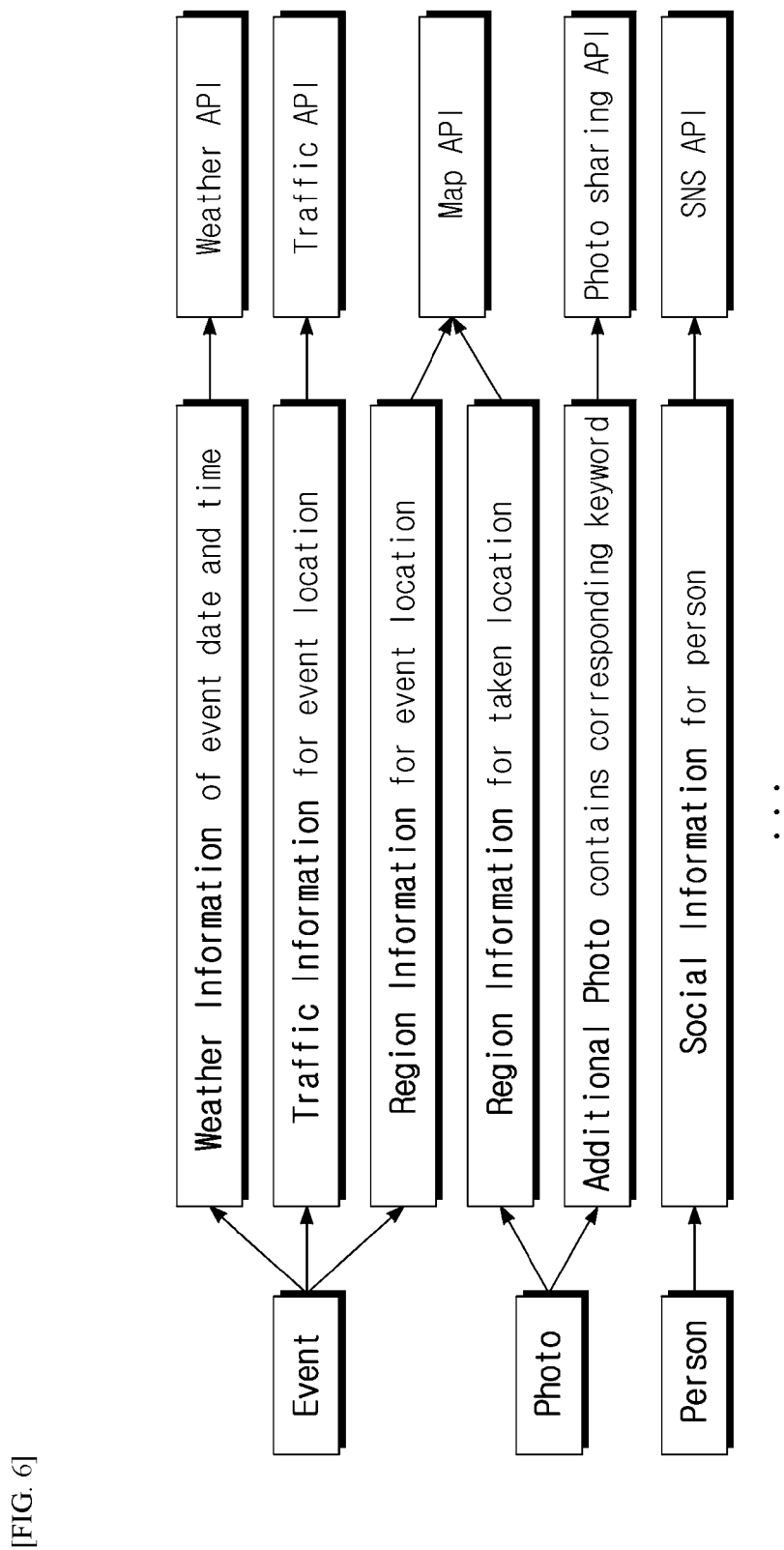
[FIG. 6]

[FIG. 7]
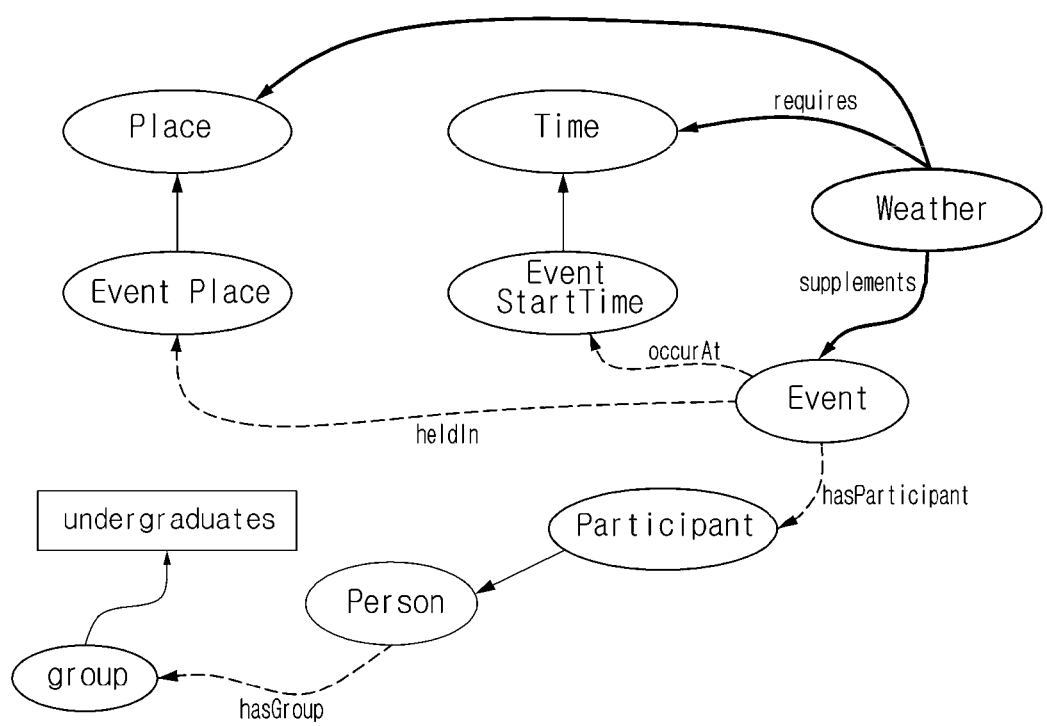

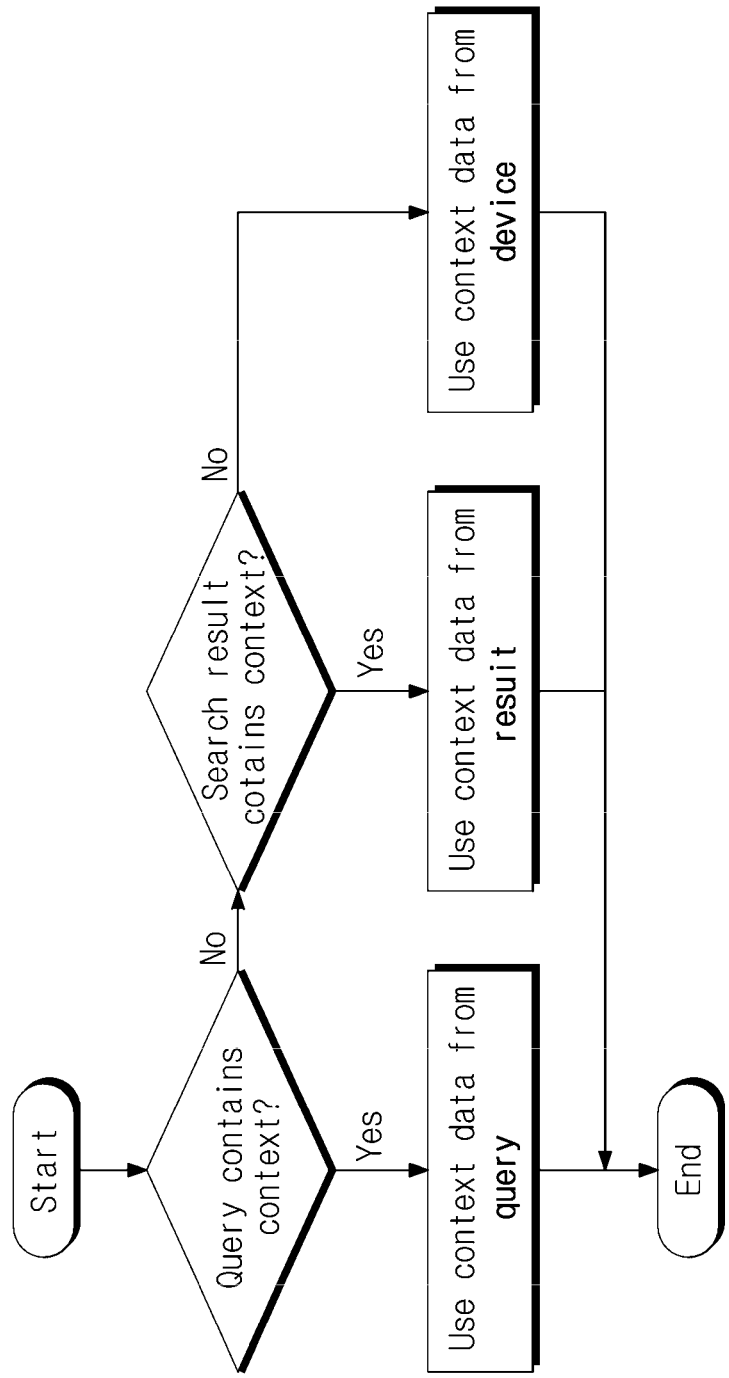
[FIG. 8]

[FIG. 9]
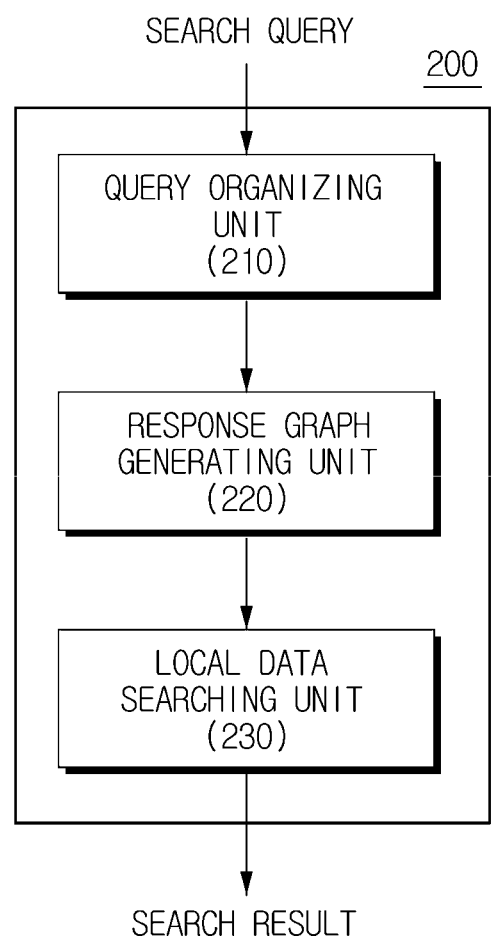

[FIG. 10]
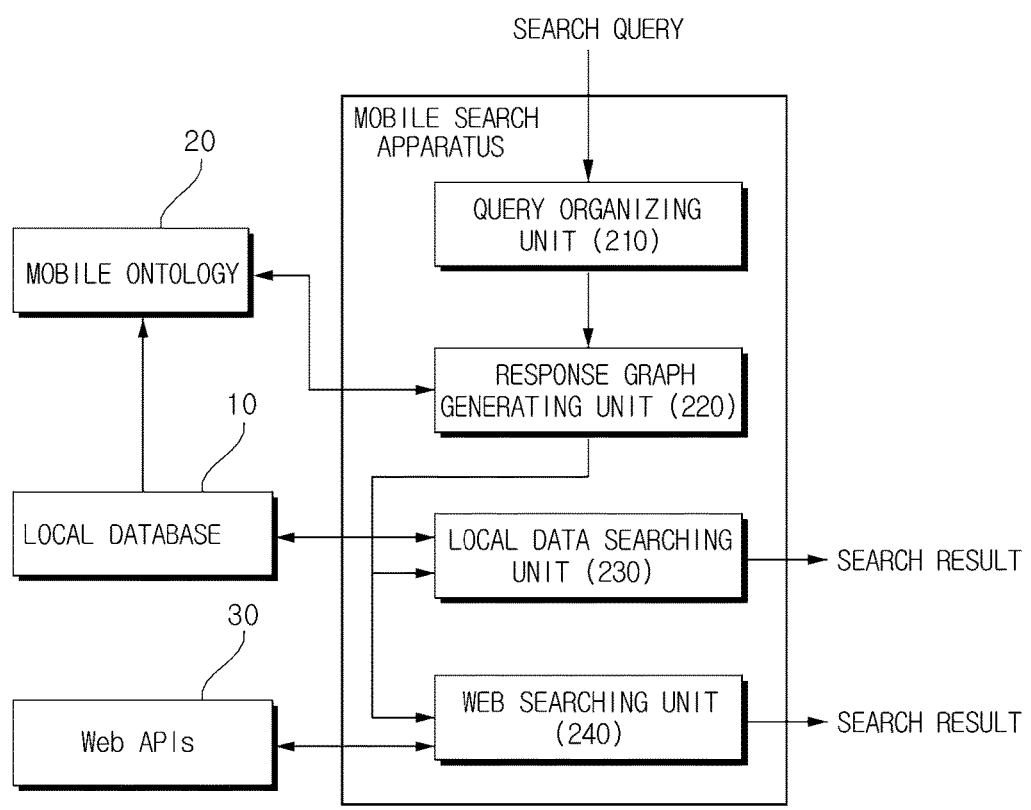

[FIG. 11]
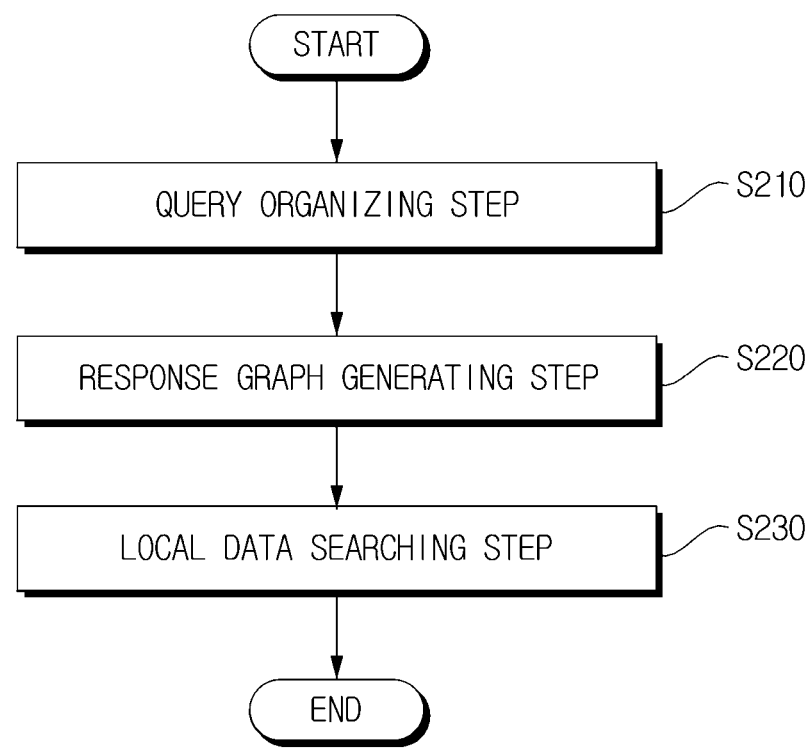

SEMANTIC SEARCH APPARATUS AND METHOD USING MOBILE TERMINAL

CROSS-REFERENCE TO RELATED APPLICATIONS

This application claims priority to and the benefit of Korean Patent Application No. 10-2015-0037336 filed in the Korean Intellectual Property Office on Mar. 18, 2015, the entire contents of which are incorporated herein by reference.

TECHNICAL FIELD

The present invention relates to an apparatus and a method of searching for information by a mobile device.

BACKGROUND ART

According to an increase in usage of various kinds of mobile devices, there are suggested various kinds of search methods for retrieving, managing, and using mobile data. Currently, most of the mobile platforms provide a full text search method based on a keyword. However, the mobile search methods in the related technologies cannot perform a combined search in databases (DBs) independently managed by respective applications, so that there is a limit in that the mobile search methods in the related technologies cannot provide a search function accurately while reflecting an intention of a user. Further, the mobile search method in the related technologies has a limit in that a search domain is limited to a database within a local device or the Web, and is separated.

In the meantime, according to an arrival of a semantic Web environment, there are suggested various semantic search methods for efficiently searching for semantic information desired by a user in a big data environment by using an ontology. However, the existing semantic search method on the Web is premised on a semantic database stored in a triple structure, and further, has a limit in that a considerable volume of resource are required for a semantic calculation.

SUMMARY OF THE INVENTION

The present invention has been made in an effort to provide a simplified ontology so as to be applicable to a mobile environment having a limited resource, and provide an ontology which is capable of supporting a combined search environment by combining DBs used by various applications within a mobile device, respectively. The present invention has also been made in an effort to provide a semantic search engine providing a function of searching a local database within a mobile device, and expanding a search to the Web as necessary and performing the search.

To this end, the present invention discloses an ontology database generated by applying the proposed ontology to a local database and a semantic search engine apparatus. Here, the semantic search engine apparatus according to the present invention includes: a query organizing unit configured to re-organize a natural language query received from a user and convert the re-organized query into a keyword graph; a response graph generating unit configured to generate a response graph including information on a query intention of the user by using the converted keyword graph and the ontology database; a point calculating unit configured to calculate the degree of a user's query intention reflected in each generated response graph, represent the degree as a score; and a search result generating unit configured to select a prior response graph based on the score, create a meta structured query language (SQL) query by using the selected prior response graph, and generate a search result for a query of the user by using the generated meta-SQL query.

An exemplary embodiment of the present invention provides a search apparatus using a mobile terminal, the search apparatus including: an ontology managing unit configured to manage an ontology of data which are searchable by the mobile terminal; and a semantic searching unit configured to receive a user's search query, generate a keyword graph, in which keywords included in the search query are connected, by analyzing a structure of the search query, generate a response graph corresponding to the keyword graph by searching for the keyword included in the keyword graph in the ontology, and search for data corresponding to the search query in a local database by using the response graph.

The ontology may include concepts, which are abstract concepts for the data stored in the local database, and connection edges, which connect the concepts with each other by using the concepts as nodes, and the concepts connected by one connection edge may be superordinate concepts representing a higher concept or subordinate concepts representing a lower concept according to a superordinate and subordinate relationship of the concepts therebetween.

The connection edge may include a sub sumption connection edge, representing a subsumption relationship between the superordinate concept and the subordinate concept or an attribute connection edge representing an attribute relationship between the superordinate concept and the subordinate.

The local database may include one or more partial databases, the ontology may include a most significant concept, which is an abstract concept representing the partial database, and the concepts for the data, which are included in the partial database, for each partial database, and the most significant concept may be connected with the adjacent subordinate concept among the concepts for the data included in the partial database through the connection edge.

The concept for the data included in each partial database may be connected to a combined concept, which the partial databases included in the local database commonly use, through the subsumption connection edge, and the ontology managing unit may generate a combined ontology for the plurality of partial databases by using the combined concept.

The semantic searching unit may extract the keywords from words included in the search query by analyzing a structure of the received search query, classify the extracted keywords into any one of an object keyword representing a search object of the search query, a relationship keyword representing a relationship of the search query, and an information keyword representing information of the search query, and generate the keyword graph, in which the keywords are connected.

The keyword graph may have the object keyword as a start node and be a graph, in which the relationship keyword node and the information keyword node are connected.

The semantic searching unit may select the concepts corresponding to the keywords by searching for the keywords included in the keyword graph in the ontology, and generate the response graph by connecting the selected concepts.

The semantic searching unit may generate the response graph by, when the keyword corresponds to the object keyword, selecting the concept corresponding to the keyword in the ontology and setting the selected concept as a start node of the response graph, by, when the keyword corresponds to the relationship keyword, selecting the connection edge corresponding to the keyword from the connection edges included in a subordinate level of the concept setting as the start node of the response graph in the ontology and adding the selected connection edge to the response graph as an edge, and by, when the keyword corresponds to the information keyword, selecting the concept corresponding to the keyword from the concepts, which are included in a subordinate level of the connection edge added to the response graph as the edge, in the ontology and adding the selected concept to the response graph as a node.

When the semantic searching unit selects the connection edge corresponding to the keyword in the ontology in the case where the keyword corresponds to the relationship keyword, the semantic searching unit may select the connection edge having a synonym relationship with the keyword as the connection edge corresponding to the keyword.

When the semantic searching unit selects the concept corresponding to the keyword in the ontology in the case where the keyword corresponds to the information keyword, the semantic searching unit may select the concept as the concept corresponding to the keyword when data including the keyword as a partial structure exists in the data of the local database corresponding to the concept.

When the semantic searching unit generates one or more response graphs, the semantic searching unit may calculate a score by using similarity or a correlation between each response graph and the information keyword included in the keyword graph and select the response graph having the highest calculated score as a final response graph, and when the semantic searching unit generates one response graph, the semantic searching unit may select the response graph as the final response graph.

The semantic searching unit may calculate the score by summing weights of the similarity and the correlation.

The similarity may be a value obtained by measuring character string similarity between the information keyword included in the keyword graph and the data of the local database corresponding to the concept of the response graph corresponding to the information keyword.

The correlation may be a value obtained by calculating a degree, by which the data corresponding to the information keyword occupies a position in a field.

The semantic searching unit may generate a structured query language (SQL) query corresponding to the final response graph, and search for data corresponding to the final response graph in the local database by executing the generated SQL query and obtain the data, and the SQL query may include sub-SQL queries having an inclusion relationship therebetween.

The semantic searching unit may connect the start node of the response graph with a supplement concept through the connection edge, and search for data corresponding to the supplement concept in an external web connected with the semantic searching unit by using a web application program interface (API), and obtain the data.

The semantic searching unit may search for the data corresponding to the supplement concept by using the concept included in the ontology as an input variable of the web API, and connect the concept, which becomes the input variable of the web API, with the supplement concept through the connection edge and add the concept to the response graph.

Another exemplary embodiment of the present invention provides a search apparatus using a mobile terminal, the search apparatus including: a query organizing unit configured to receive a search query, analyze a structure of the search query, and generate a keyword graph, in which keywords included in the search query are connected; a response graph generating unit configured to search for the keywords included in the keyword graph in ontology for data stored in a local database and generate a response graph corresponding to the keyword graph; and a local data searching unit configured to search for data corresponding to the search query in the local database by using the response graph.

The ontology may include concepts, which are abstract concepts for the data stored in the local database, and connection edges, which connect the concepts with each other by using the concepts as nodes, and the concepts connected by one connection edge may be superordinate concepts representing a higher concept or subordinate concepts representing a lower concept according to a superordinate and subordinate relationship of the concepts therebetween.

The query organizing unit may extract the keywords from words included in the search query by analyzing a structure of the received search query, classify the extracted keywords into any one of an object keyword representing a search object of the search query, a relationship keyword representing a relationship of the search query, and an information keyword representing information of the search query, and generate the keyword graph, in which the keywords are connected.

The response graph generating unit may select the concepts corresponding to the keywords by searching for the keywords included in the keyword graph in the ontology, and generate the response graph by connecting the selected concepts.

The response graph generating unit may generate the response graph by, when the keyword corresponds to the object keyword, selecting the concept corresponding to the keyword in the ontology and setting the selected concept as a start node of the response graph, by, when the keyword corresponds to the relationship keyword, selecting the connection edge corresponding to the keyword from the connection edges included in a subordinate level of the concept set as the start node of the response graph in the ontology and adding the selected connection edge to the response graph as an edge, and by when the keyword corresponds to the information keyword, selecting the concept corresponding to the keyword from the concepts, which are included in a subordinate level of the connection edge added to the response graph as the edge, in the ontology and adding the selected concept to the response graph as a node.

The local data searching unit may generate a structured query language (SQL) query corresponding to the response graph, and search for data corresponding to the response graph in the local database by executing the generated SQL query, and obtain the data.

The search apparatus may further include a web searching unit configured to connect a start node of the response graph with a supplement concept through the connection edge, and search for data corresponding to the supplement concept in an external web connected with the search apparatus using the mobile terminal by using a web application program interface (API), and obtain the data.

Yet another exemplary embodiment of the present invention provides a search method using a mobile terminal, the search method including: a query organizing operation of receiving a search query, analyzing a structure of the search query, and generating a keyword graph, in which keywords included in the search query are connected; a response graph generating operation of searching for the keywords included in the keyword graph in ontology for data stored in a local database and generating a response graph corresponding to the keyword graph; and a searching operation of searching for data corresponding to the search query in the local database by using the response graph.

The ontology may include concepts, which are abstract concepts for the data stored in the local database, and connection edges, which connect the concepts with each other by using the concepts as nodes, and the concepts connected by one connection edge may be superordinate concepts representing a higher concept or subordinate concepts representing a lower concept according to a superordinate and subordinate relationship of the concepts therebetween.

According to the mobile semantic search apparatus and method according to the present invention, it is possible to perform a semantic search even in a mobile environment with limited resources by using simplified ontology. Further, it is possible to provide a combined search environment for databases used by various applications of a mobile device.

It is also possible to search for information appropriate to an intention of a user by using query information and context information of the user. Further, it is possible to search for information by expanding the search to a web, as well as a local database, as necessary.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a block diagram of a mobile search device according to the present invention.

FIG. 2 is a reference view for describing mobile ontology according to the present invention.

FIG. 3 is a reference view for describing an operation of extracting a keyword and an operation of generating a keyword graph by a semantic searching unit.

FIG. 4 is a reference view for describing a response graph generated by the semantic searching unit.

FIG. 5 is a reference view for describing a structured query language (SQL) query generated by the semantic searching unit.

FIG. 6 is a diagram illustrating a relationship between useful web information and a mobile search result.

FIG. 7 is a reference view for describing an operation of expanding a response graph by the semantic searching unit.

FIG. 8 is a diagram illustrating a decision rule for applying a web API according to the present invention.

FIG. 9 is a detailed block diagram of the semantic searching unit.

FIG. 10 is a block diagram of a mobile search device according to another exemplary embodiment of the present invention.

FIG. 11 is a flowchart of a mobile search method according to yet another exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in adding reference numerals to constituent elements of each drawing, it should be noted that like reference numerals are used for like constituent elements even though the constituent elements are illustrated in different drawings. Further, in the following description of the present disclosure, a detailed description of publicly known configurations or functions incorporated herein will be omitted when it is determined that the detailed description may make the subject matter of the present disclosure unclear. Further, an exemplary embodiment of the present invention will be described below, but the technical spirit of the present invention is not limited thereto and may be modified and variously carried out by those skilled in the technology.

In general, ontology refers to a formal and explicit specification for shared conceptualization, and particularly, in the present invention, simplified ontology so as to be applicable to a mobile environment is described as an example.

Simplified ontology so as to be applicable to a mobile environment is referred to as mobile ontology.

FIG. 1 is a block diagram of a mobile search device according to the present invention.

The mobile search device according to the present invention includes a mobile ontology managing unit 100 and a semantic searching unit 200.

The mobile search device according to the present invention receives a search query and performs a search in a local database 10.

The local database 10 may be a database stored within a mobile device, in which the mobile search device is installed. The local database 10 is a database for storing, classifying, and managing data, which is collected and stored by the mobile device. For example, the mobile device may collect and store data for a surrounding environment by using various sensors, or receive specific data through a user input or a connection with an external device and store the received specific data. The database classifying and managing data locally stored in the mobile device as described above may become the local database 10.

The local database 10 may include one or more partial databases which will be described in detail below. In this case, the partial databases may be respective databases used and managed by an application or a program operated in the mobile device.

The mobile search device according to the present invention may first search for information requested according to a search query in the local database 10 and provide the searched information.

First, the mobile ontology managing unit 100 manages mobile ontology for data stored in the local database 10.

Here, the mobile ontology managing unit 100 may store the mobile ontology therein as necessary, or access the mobile ontology stored outside and manage, such as generate, change, or update, the mobile ontology according to the local database 10.

Next, the semantic searching unit 200 searches for the search query in the mobile ontology, and searches for data corresponding to the search query.

To this end, the semantic searching unit 200 receives the search query, generates a keyword graph, in which keywords included in the search query are connected, by analyzing a structure of the search query, generates a response graph corresponding to the keyword graph by searching for the keyword included in the keyword graph in the mobile ontology, and searches for data corresponding to the search query in the local database 10 by using the response graph.

Next, an operation of the mobile ontology managing unit 100 and the mobile ontology managed by the mobile ontology managing unit 100 will be described in more detail.

The mobile ontology includes concepts, which are abstract concepts for data stored in the local database 10, and connection edges, which connect the concepts with each other by using the concepts as nodes.

That is, data having a uniform common denominator among the data stored and managed in the local database 10 are classified into one category, and the respective categories may have a predetermined relationship, and when this is expressed with ontology, one concept may be set as an abstract concept for the data classified into one category. Further, the concepts set as described above may be connected to each other through the connection edge in the mobile ontology. In this case, a superordinate concept and subordinate concept relationship may be set between the concepts connected to each other through the connection edge according to a relationship, and the concepts may also be connected by an attribute connection edge representing an attribute or a subsumption connection edge representing subsumption according to a property of the relationship between the concepts.

FIG. 2 is a reference view for describing the mobile ontology.

The mobile ontology may set concept "Person" as an abstract concept for the data stored in the local database 10 like "Person" C3 of FIG. 2. In this case, the data stored in the local database 10 corresponding to the concept "Person" may be various person objects. In this case, the person object data stored in the local database 10 may include information, such as a name, a subsumption group, or a telephone number of each person object. In this case, the mobile ontology may set each information data as concept "Name", concept "Group", and concept "PhoneNumber" again. In this case, the concept "Person" and the concept "Name", the concept "Group", and the concept "PhoneNumber" may have an attribute relationship therebetween, so that the concept "Person" may be connected with each of the concept "Name", the concept "Group", and the concept "PhoneNumber" through an attribute connection edge E1.

Referring to FIG. 2, concept "Email" may be set as an abstract concept for email data stored in the local database 10 like "Email" C1. Further, information about a sender and a person for carbon copy may be stored in the email data stored in the local database 10. In this case, the mobile ontology may set concept "Sender" as an abstract concept for each of the sender data stored in the local database 10 and set concept "CC" C2 as an abstract concept for each of the data of a person for carbon copy, and connect the concept "Email" C1 to each of the concept "Sender" and the concept "CC" C2 through the attribute connection edge E1.

Since both the concept "Sender" and the concept "CC" C2 have a common denominator of a person, the concept "Sender" and the concept "CC" C2 may be connected with concept "Person" C3 through a subsumption connection edge E2 as illustrated in FIG. 2.

That is, the concepts in the mobile ontology according to the present invention may be connected with each other through the connection edge, and herein, the connection edge may include the subsumption connection edge representing a subsumption relationship between the superordinate concept and the subordinate concept or the attribute connection edge representing an attribute relationship between the superordinate concept and the subordinate concept.

The concepts connected by one connection edge may be a superordinate concept representing a higher concept or a subordinate concept representing a lower concept according to the superordinate and subordinate relationship of the concepts therebetween.

For example, in the example of FIG. 2, since the concept "Sender" and the concept "Person" have a relationship in which the concept "Sender" belongs to the concept "Person", the concept "Sender" may be a subordinate concept and the concept "Person" may be a superordinate concept. That is, the superordinate and subordinate relationship of the concepts may be set according to the subsumption relationship between the concepts.

Otherwise, the superordinate and subordinate relationship of the concepts may also be set according to an attribute relationship between the concepts as necessary. That is, when concept "A" has an attribute of concept "B", the concept "A" may be a superordinate concept and the concept "B" may be a subordinate concept. Based on the example of FIG. 2, the concept "Email" has an attribute of the concept "Sender" and the concept "Email" and the concept "Sender" are connected by the attribute connection edge, so that in this case, the concept "Email" may be a superordinate concept and the concept "Sender" may be a subordinate concept.

Since the superordinate concept and the subordinate concept as described above are relatively set between both concepts connected based on one connection edge, in consideration of the entire mobile ontology, a specific concept set as a subordinate concept may also be set as a superordinate concept in a connection relationship with another concept.

In the meantime, the local database 10 may include one or more partial databases.

As described above, the partial databases may be respective databases used and managed by an application or a program operated in the mobile device. For example, a partial database for a picture managed by a photograph application and a partial database for an email managed by an email management application may be present in the mobile device, and in this case, the local database 10 may include the aforementioned partial databases.

In this case, the mobile ontology may include a most significant concept, which is an abstract concept representing the partial database, and the concepts for data, which are included in the partial database for each partial database.

First, the mobile ontology may include a most significant concept, which is an abstract concept representing the partial database. For example, the mobile ontology may set the concept "Email" C1, which is an abstract concept representing the partial database for the email, as the most significant concept and include the concept "Email" C1.

The mobile ontology may include concepts, which are abstract concepts for the data included in the partial database for the email under the most significant concept set as described above. Further, the aforementioned concepts may be connected with each other while having a hierarchical structure through the connection edge under the most significant concept.

Referring to FIG. 2, the data about the sender and the person for carbon copy may be stored in the partial database for the email for each email, and in this case, the concept "Email" C1, which is the most significant concept is connected with the concept "Sender" and the concept "CC" through the connection edge, so that the mobile ontology may include the most significant concept and the concepts under the most significant concept.

That is, the most significant concept may be connected with the adjacent subordinate concept among the concepts for the data included in the partial database through the connection edge.

The concept for the data included in each partial database may be connected to a combined concept, which the partial databases included in the local database 10 commonly use, through the subsumption connection edge.

For example, referring to FIG. 2, the concept "Email", concept "Photo", and concept "Event" may be the most significant concepts set for the partial database for the email, the partial database for photograph, and the partial database for a schedule management, respectively, and the concepts under the most significant concepts may be connected with the most significant concepts through the connection edges, respectively.

In this case, the mobile ontology managing unit 100 may generate the mobile ontology combined for the plurality of partial databases by using the combined concept. That is, the mobile ontology according to the present invention combines the respective concepts connected to the most significant concepts by using the combined concept, which is the abstract concept, which the partial databases commonly use, in order to generate one ontology by combining the plurality of partial databases separately existing as described above.

For example, referring to FIG. 2, the concept "Sender" and the concept "CC" connected to the concept "Email", which is the most significant concept through the connection edge, and concept "TakenPerson" connected to the concept "Photo", which is the most significant concept, through the connection edge have a common denominator that the concepts are related to a person object, and thus the mobile ontology according to the present invention connects all of the concepts to the combined concept, which is the concept "Person", through the connection edge, thereby combining the partial database for the email represented by the concept "Email" and the partial database for the photograph represented by the concept "Photo" into one ontology. Then, the mobile ontology managing unit 100 may generate the mobile ontology by performing the aforementioned operation.

Next, an operation of the semantic searching unit 200 will be described in more detail.

First, the semantic searching unit 200 receives a search query, analyzes a structure of the search query, and generates a keyword graph, in which keywords included in the search query are connected. Secondly, the semantic searching unit 200 searches for the keywords included in the keyword graph in the mobile ontology, and generates a response graph corresponding to the keyword graph. Thirdly, the semantic searching unit 200 searches for data corresponding to the search query in the local database 10 by using the response graph. Hereinafter, each operation of the semantic searching unit 200 will be described in more detail.

First, the semantic searching unit 200 receives a search query, analyzes a structure of the search query, and generates a keyword graph, in which keywords included in the search query are connected.

Here, the search query is input from a user or an external device and may have a form of a sentence or a structure. For example, a sentence directly input by the user through a keyboard may also be input as the search query, and a sentence recognized from a voice spoken from the user through a voice recognizing unit may also be input as the search query.

Here, the semantic searching unit 200 analyzes a structure of the received search query, and extracts the keywords from words included in the search query.

Here, the keywords mean core words representing the contents of search query in the search query. The semantic searching unit 200 may analyze a structure of the search query and select, as the keywords, core words, such as a subject, an object, and a predicate, which are included in the query, except for words, such as an article, a postposition, or a relative pronoun, which serves as an auxiliary function.

To this end, the semantic searching unit 200 may generate a natural language graph by analyzing the search query, and then select the keywords from the natural language graph. For example, the semantic searching unit 200 may use "Stanford NLP parser" in order to analyze the search query and generate the natural language graph. Next, the semantic searching unit 200 may select, as the keywords, core words, such as a subject, an object, and a predicate, which are included in the query from the natural language graph, except for words, such as an article, a postposition, or a relative pronoun, which serve as an auxiliary function.

Next, the semantic searching unit 200 classifies the extracted keywords into any one of an object keyword representing a search object of the search query, a relationship keyword representing a relationship of the search query, and an information keyword representing information of the search query, and generates the keyword graph, in which the keywords are connected.

Here, the object keyword is a keyword representing a search object among the keywords included in the search query. Further, the relationship keyword is a keyword representing a relationship and may be a predicate, such as a verb. Further, the information keyword may be a word, such as a noun.

FIG. 3 is a reference view for describing an operation of extracting the keyword and an operation of generating the keyword graph by the semantic searching unit 200.

Referring to FIG. 3, the semantic searching unit 200 may receive a search query "What are events that undergraduates participate in", and extract "events" as an object keyword, "participateIn" as a relationship keyword, and "undergraduates" as an information keyword by analyzing a structure of the search query. Further, the semantic searching unit 200 may generate a keyword graph, such as "events"=>"participateIn"=>"undergraduates" by connecting the extracted keywords. Further, the semantic searching unit 200 may generate a natural language graph by analyzing the structure of the search query during the process of extracting the keywords, and extract the keywords by using nodes included in the natural language graph.

Here, the keyword graph has the object keyword as a start node and is a graph, in which the relationship keyword node and the information keyword node are connected. Here, the keyword graph may include one or more connections of the relation keyword node and the information keyword node. For example, the keyword graph, such as ("object keyword"=>"relationship keyword"=>"information keyword"=>"relationship keyword"=>"information keyword") may also be generated.

Secondly, the semantic searching unit 200 searches for the keywords included in the keyword graph in the mobile ontology and generates a response graph corresponding to the keyword graph.

The semantic searching unit 200 selects the concepts corresponding to the keywords by searching for the keywords included in the keyword graph in the mobile ontology, and generates the response graph by connecting the selected concepts.

Here, when the keyword corresponds to the object keyword, the semantic searching unit 200 selects the concept corresponding to the keyword in the mobile ontology and sets the selected concept as a start node of the response graph.

When the keyword corresponds to the relationship keyword, the semantic searching unit 200 selects the connection edge corresponding to the keyword among the connection edges, which are included in a subordinate level of the concept set as the start node of the response graph, in the mobile ontology and adds the selected connection edge to the response graph as an edge.

Here, when the semantic searching unit 200 selects the connection edge corresponding to the keyword in the mobile ontology in the case where the keyword corresponds to the relationship keyword, the semantic searching unit 200 may select the connection edge having a synonym relationship with the keyword as the connection edge corresponding to the keyword.

Here, the semantic searching unit 200 may refer to a predetermined synonym dictionary database in order to select the connection edge having the synonym relationship with the keyword.

When the keyword corresponds to the information keyword, the semantic searching unit 200 selects the concept corresponding to the keyword among the concepts included in a subordinate level of the connection edge, which is added as the edge to the response graph, in the mobile ontology, and adds the selected concept to the response graph as a node.

Here, when the semantic searching unit 200 selects the concept corresponding to the keyword in the mobile ontology in the case where the keyword corresponds to the information keyword, and when there exists data including the keyword as a partial structure (substring) among the data of the local database 10 corresponding to the concept, the semantic searching unit 200 may select the concept as the concept corresponding to the keyword.

The semantic searching unit 200 generates the response graph by adding the corresponding keyword to the response graph by different methods according to the type of each keyword as described above.

FIG. 4 is a reference view representing the response graph generated by the semantic searching unit 200 by using the keyword graph generated as illustrated in FIG. 3 and the mobile ontology illustrated in FIG. 2. Hereinafter, an operation of the semantic searching unit 200 will be described with reference to the examples of FIGS. 2 to 4.

The keyword graph generated as illustrated in FIG. 3 includes "events" as an object keyword, "participateIn" as a relationship keyword", and "undergraduates" as an information keyword.

First, the semantic searching unit 200 searches the mobile ontology in order to select a concept corresponding to the object keyword "events". When the semantic searching unit 200 searches the mobile ontology illustrated in FIG. 2, since there exists the concept "Event", the semantic searching unit 200 selects the concept "Event" and sets the concept "Event" as a start node of a response graph.

Next, the semantic searching unit 200 searches for a connection edge corresponding to the relationship keyword "participateIn" in the connection edges included in a subordinate level of the concept "Event" that is set as the start node of the response graph. In a case of the mobile ontology of FIG. 2, since there exists attribution connection edge "hasParticipant" connected to the concept "Event", the semantic searching unit 200 selects the connection edge "hasParticipant" and adds the selected connection edge "hasParticipant" to the response graph as an edge as illustrated in FIG. 4. In this case, when the semantic searching unit 200 selects the connection edge "hasParticipant" as the connection edge corresponding to the relationship keyword "participateIn", the semantic searching unit 200 may determine that "participateIn" has a synonym relationship with "hasParticipant", and select the connection edge "hasParticipant" as the connection edge corresponding to the relationship keyword "participateIn". Here, the semantic searching unit 200 may determine the synonym relationship by referring to the predetermined synonym dictionary database.

Next, the semantic searching unit 200 may select a concept corresponding to the information keyword "undergraduates" in the mobile ontology and add the selected concept to the response graph as a node. In this case, the concept corresponding to the information keyword is searched in a subordinate level of the connection edge added to the response graph as the edge corresponding to the relationship keyword. That is, according to the example, the concept corresponding to the information keyword is searched in a subordinate level of the connection edge "hasParticipant" within the mobile ontology of FIG. 2. The fact that the concept corresponding to the information keyword is searched in the subordinate level of the connection edge means that the concept corresponding to the information keyword is searched in the subordinate concept connected by the connection edge and concepts connected to the subordinate concept again. Further, the search for the concept corresponding to the information keyword means to search whether the data including the information keyword as the partial structure exists in the data of the local database 10 corresponding to the concept. That is, since the concept is an abstract concept for the data included in the local database 10, when data, of which a structure is partially matched to the information keyword, exists in the data stored in the local database 10 corresponding to the corresponding concept, the concept of the matched data is selected as a concept corresponding to the information keyword. For example, the semantic searching unit 200 searches for data including structure "undergraduates", which is the information keyword, as a partial structure in the local database 10, and for example, when data "undergraduates group" exists and is searched in the local database 10 and the data "undergraduates group" corresponds to the concept "Group" within the mobile ontology, the semantic searching unit 200 may select the concept "Group" as a concept corresponding to the information keyword "undergraduates" and adds the concept "Group" to the response graph.

In this case, the semantic searching unit 200 may add the information keyword corresponding to the corresponding concept to the response graph together with the concept corresponding to the information keyword as necessary. That is, as illustrated in FIG. 4, the semantic searching unit 200 may connect the information keyword "undergraduates" to the concept "Group" and add the information keyword "undergraduates" to the response graph together with the concept "Group".

Here, when the several response graphs including all of the keywords included in the keyword graph are generated during the process of searching the mobile ontology and selecting the concept, the semantic searching unit 200 may select a graph having the shortest length as the response graph.

When the concept corresponding to the information keyword is added to the response graph, the semantic searching unit 200 may add a graph from the connection edge corresponding to the relationship keyword to the corresponding concept in the mobile ontology to the response graph together with the corresponding concept. That is, for example, when the concept "Group" is added as illustrated in FIG. 4, a graph "Participant"=>"Person"=>"Group" from the connection edge "hasParticipant" to the concept "Group" in the mobile ontology in FIG. 2 may be added to the response graph.

Table 1 below expresses with a pseudo code the operation of searching, by the semantic searching unit 200, the mobile ontology by using the keyword graph and generating the response graph as described above.

TABLE 1

```
Input: keyword pair<type, keyword> set K
Output: Answer graphA
1:   A = NULL
2:   Let N_C be a cursor node of graph
3:foreach keyword pair k from Kdo
4:switch k.type
5:      case Target:
6:N_C = matched concept from ontology
7:         A.root = N_C
8:         Add N_C to A
9:      case Relation:
10:P= {rdfs:ObjectProperty p | p.domain = N_C}
11:        foreach ObjectProperty p from Pdo
12:          ifp equals to K_i.keywordthen
13:            N_C.next = p.object
14:            N_C = N_C.next
15:            Add N_C to A
16:          break
17:          end if
18:       end foreach
19:       ifN_Chas superclass then
20:           N_C = N_C.superclass
21:           Add N_C to A
22:       end if
23:   case Informative:
24:N= {rdfs:concept n | n = N_C.property.domain }
25:      foreachconcept n from N do
26:         ifn.dbcontains k.keywordthen
27:            Add n to A
28:         end if
29:      end foreach
30:   end switch
31: end foreach
32: return A
```

In a case where the plurality of concepts is selected when the semantic searching unit 200 searches for a concept corresponding to the information keyword in the mobile ontology and selects the concept, a plurality of response graphs having the same length may be generated. For example, when k information keywords are included in the keyword graph and $d_k$ concepts are searched for the $k^{th}$ information keyword as a result of the searching for the concept corresponding to each information keyword in the mobile ontology, the total number of generated response graphs may be $d_1 \times d_2 \times \ldots \times d_k$.

When the plurality of response graphs having different concepts, which have the same length and correspond to the information keyword, is generated, the semantic searching unit 200 may calculate a score for each generated response graph, and select a final response graph to be used for the search among the response graphs based on the score.

The score serving as the reference for calculating the final response graph may be calculated by using similarity or a correlation between each response graph and the information keyword included in the keyword graph.

That is, when the semantic searching unit 200 generates one or more response graphs, the semantic searching unit 200 may calculate a score by using similarity or a correlation between each response graph and the information keyword included in the keyword graph, and select the response graph having the highest calculated score as a final response graph.

In this case, the semantic searching unit 200 may weight-sum the similarity and the correlation and calculate the score.

Here, the score UserIntention($K_M$, $G_A$) may be calculated by Equation 1 below.

$$\text{UserIntention}(K_M, G_A) = \alpha \times \text{Similarity}(K_M, G_A) + \beta \times \text{Correlation}(K_M, G_A) \quad [\text{Equation 1}]$$

Here, $\alpha$ and $\beta$ are weighted values ($\alpha+\beta=1$), $K_M$ is information keywords given by a user, $G_A$ is a response graph, Similarity($K_M$, $G_A$) is a function calculating similarity, and Correlation($K_M$, $G_A$) is a function calculating a correlation.

Here, the similarity may be calculated by using a value obtained by measuring character string similarity between the information keyword included in the keyword graph and the data of the local database 10 corresponding to the concept of the response graph corresponding to the information keyword. That is, the similarity is calculated by using a value obtained by measuring character string similarity between the data within the local database 10 corresponding to the concept, which corresponds to the information keyword and is selected within the mobile ontology, and the information keyword.

For example, referring to FIG. 4, when the concept "Group" is selected in the mobile ontology as the concept corresponding to the information keyword "undergraduates" and the data "undergraduates group" is searched and selected in the local database 10, the semantic searching unit 200 may calculate the similarity by using a value obtained by measuring character string similarity between the information keyword "undergraduates" and the data "undergraduates group".

Here, the similarity may be calculated so that when the character string similarity is large, the similarity is large.

Here, the similarity Similarity($K_M$, $G_A$) may be calculated by Equation 2 below.

$$\text{Similarity}(K_M, G_A) = \sum_{i=1}^{n} \left\{ \sum_{j=1}^{m} \left( 1 - \frac{\frac{1}{m} \times \text{LevenshteinDistance}(mk_i, d_{ij})}{d_{ij}.\text{length}} \right) \right\} \quad [\text{Equation 2}]$$

Here, $mk_i$ represents the $i^{th}$ information keyword, $d_{ij}$ represents $j^{th}$ mobile raw data including the $mk_i$ as a substring within a predetermined field, $d_{ij}$.length represents a length of a character string of $d_{ij}$, and LevenshteinDistance $(mk_i,d_{ij})$ represents the number of conversions required when $mk_i$ is converted into $d_{ij}$.

For example, it is assumed that information keyword $mk_1$ given by a user is "marriot", and the keyword "marriot" is mapped to data within field "EventPlace" of table "Event".

When there are four elements of data, such as "marriot inn", "marriot lobby", "south marriot", and "marriot hotel" in the field "EventPlace", $d_{11}$, $d_{12}$, $d_{13}$, and $d_{14}$ correspond to "marriot inn", marriot lobby", "south marriot", and "marriot hotel", respectively.

Here, since "marriot" is the information keyword simply mapped to the raw data, a value of n is 1. In addition, in the example, m represents the number of elements of data and is 4. In addition, when j=1, $d_{11}$.length and LevenshteinDistance$(mk_1,d_{11})$ are 11 and 14, respectively. When j=2, 3, and 4, $d_{11}$.length and LevenshteinDistance$(mk_1,d_{1j})$ are calculated as 13 and 6. In conclusion, the similarity Similarity $(K_M, G_A)$ has a value of 0.56 by Equation 2.

Here, the similarity of the character string may be measured by using Levenstein Distance that is a distance according to the number of characters to be converted for the match between two character strings.

The correlation may be a value obtained by calculating a degree, by which the data corresponding to each information keyword occupies a position in the selected field. That is, when all of the data having the same value belong to different fields, a relationship between the field including the data and the keyword is evaluated stronger than a relationship between the keyword and the data. In order to reflect the tendency, the correlation is calculated and is reflected to the score. Here, the correlation is a value obtained by calculating a degree, by which the data corresponding to each information keyword occupies a position in the selected field.

Here, the correlation Correlation$(K_M, G_A)$ may be calculated by Equation 3 below.

$$\text{Correlation}(K_M, G_A) = \frac{1}{n} \times \sum_{i=1}^{n} \frac{|D_i, \text{contains}(mk_i)|}{|\text{AllContains}(mk_i)|} \quad \text{[Equation 3]}$$

Here, $D_i$ represents a DB field corresponding to the $i^{th}$ information keyword $mk_i$, $|\text{AllContains}(mk_i)|$ means the number of rows including $mk_i$ as the substring in all of the fields, and $|D_i,\text{contains}(mk_i)|$ means the number of rows of $D_i$ including $mk_i$ as the substring.

For example, it is assumed that the query of a user includes "undergraduates" as the information keyword of table "Person".

In the table "Person", there are five people subsumption to a group named "undergraduates". Further, there is a contact in which his/her name is "undergraduates". In this case, the information keyword "undergraduates" may be mapped to both the name and group concepts.

When $mk_1$ is "undergraduates", two kinds of response graphs are generated, and herein, $D_1$ is a name and a group. The two response graphs are defined as $G_A$ and $G_A'$, respectively. When the correlations of the response graphs are calculated, the correlation of the former is calculated as ⅙, and the correlation of the latter is calculated as ⅚. Accordingly, it can be seen that $G_A'$ reflects better a query intention of the user.

The response graph having the highest score may be selected as a final response graph based on the score obtained by weight-summing the correlation and the similarity calculated as described above.

In the meantime, when one response graph is generated, the response graph may be selected as a final response graph to be used for the search.

Thirdly, the semantic searching unit 200 searches for data corresponding to the search query in the local database 10 by using the final response graph.

The semantic searching unit 200 generates an SQL query corresponding to the final response graph, and searches for data corresponding to the final response graph in the local database 10 by executing the generated SQL query, and obtains the data.

Here, the semantic searching unit 200 may generate the SQL query so that the SQL query is divided into sub-SQL queries. That is, the SQL query may include one or more sub-SQL queries which have an inclusion relationship with each other. Further, the semantic searching unit 200 may generate the SQL query in a form, in which respective sub-SQL queries are multiplexed with each other, so that one sub-SQL queries is included in another sub-SQL query.

By using the sub-SQL queries which have an inclusion relationship with each other, the semantic searching unit 200 obtains a search result by executing each sub-SQL query in a corresponding partial database, and makes a superordinate sub-SQL query be executed in the corresponding partial database again by using the search result as an input of a superordinate inclusion-related sub-SQL query again, so that it is possible to execute the SQL query corresponding to the final response graph in the local database 10 including the plurality of partial databases and obtain a search result for executing the SQL query.

Here, the sub-SQL query may include a select phrase, a place (where) phrase, and a content phrase.

That is, the sub-SQL query may be formed of {Select phrase, Where phrase, and content phrase}.

FIG. 5 is a reference view for describing an SQL query generated by the semantic searching unit 200.

The semantic searching unit 200 may generate an SQL query, such as {"Event", "Participant", {"Person", "Group", "undergraduates"}} illustrated in FIG. 5, for the response graph illustrated in FIG. 4. Here, the SQL query is formed of the multiplexed sub-SQL queries as described above. That is, the sub-SQL query, such as {"Person", "Group", "undergraduates"}, is generated, a search is performed in a corresponding partial database by executing the generated sub-SQL query, and then a result of the search is input to a part NULL of a sub-SQL query {"Event", "Participant", NULL} and is executed in the corresponding partial database again, so that a final search result may be obtained.

Here, in the sub-SQL query {"Person", "Group", "undergraduates"}, the Select phrase may be "Person", the Where phrase may be "Group", and the content phrase may be "undergraduates".

Table 2 below expresses with a pseudo code an operation of generating a meta-SQL from the response graph by the semantic searching unit 200.

TABLE 2

Input: Answergraph A
Output: Stack S; data type is M
  Let M be a set of SQL fragments;{$M_S$, $M_L$, $M_R$}
  $M_S$ is a SELECT component of M
  $M_L$ is a WHERE component of M
  $M_R$ is a value for comparing with $M_L$
1:  $N_C$ = MainAction of A TABLE 2-continued

```
 2:   Initialize M [M_S, M_L, M_R]
 3:   while N_C.next#NULL do
 4:      if M_S = NULL then
 5:         M_S = NC.name
 6:      else
 7:         if N_C has associated keyword then
 8:            M_R = N_C.keyword
 9:         endif
10:         M_L = N_C.name
11:         S.push(M)
12:         Reinitialize M
13:      endif
14:      N_C = N_C.next
15:   endwhile
16:   return S
```

The operation of the semantic searching unit 200 described above relates to the performance of the search in the local database 10 by using the received search query.

The semantic searching unit 200 according to the present invention may process useful web information (UWI) corresponding to an intention of a user, as well as locally stored data. That is, the semantic searching unit 200 may perform both the aforementioned search in the local database 10 and a search in an external web. To this end, the semantic searching unit 200 may use a web application program interface (API) performing a search in an external web.

FIG. 6 is a diagram illustrating a relationship between UWI and a mobile search result.

Referring to FIG. 6, UWI to be provided to a user together with a local search result during the search is identified, the identified web information is abstracted into a web (UWI) concept, for example, "Weather", "Traffic", "Map", "Photo sharing", and "SNS", and added to the existing ontology, and a relationship between the UWI concept and the existing local concept, for example, "Event", "Photo", and "Person", is defined. The web concept supplementing the local data search result is connected with a local concept through a supplement attribute, and a local concept corresponding to a parameter is connected with the web concept through a require attribute.

Here, context information of local data stored in devices or sensors are used as parameters for reflecting the context of the user.

In order to combine the data searched in the web with the existing search in the local database 10, the data searched by using the web API may be added to an existing response graph by using the supplement concept and the connection edge.

Here, the semantic searching unit 200 may connect the start node of the response graph with the supplement concept through the connection edge, and search for and obtain data corresponding to the supplement concept in an external web connected with the semantic searching unit 200 by using the web API.

Here, the semantic searching unit 200 may expand the response graph by adding the supplement concept to the response graph and connecting the supplement concept with the connection edge.

FIG. 7 is a reference view for describing an operation of expanding the response graph by the semantic searching unit 200.

As illustrated in FIG. 7, the response graph of FIG. 4 may be expanded by adding concept "Weather", which is the supplement concept, and the concept "Weather" and the concept "Event" have the "supplement" relationship, and the concept "Weather", concept "Time", and concept "Place" have a "requirement" relationship. Here, the supplement concept is a concept, which is added to the response graph generated by using the mobile ontology corresponding to the local database 10 by the semantic searching unit 200 and serves to supplement information. For example, as illustrated in FIG. 7, for the concept "Event", information about a weather corresponding to the corresponding concept "Event" may be requested. In this case, the semantic searching unit 200 may connect the concept "Weather" to the concept "Event", which is the start node of the response graph, as the supplement concept. In this case, an edge connecting the concept "Weather" may be a supplement connection edge.

Here, data corresponding to the supplement concept may be searched for and obtained using the web API from an external web. In this case, in order to search for weather data corresponding to "Event", the web API may require information about a place and a time of the corresponding event as an input. In this case, the semantic searching unit 200 may select a concept corresponding to the data required as an input variable by the web API in the mobile ontology and connect the selected concept with the supplement concept through the connection edge, and provide the data corresponding to the selected concept to the web API as the input variable.

Here, the semantic searching unit 200 may search for the data corresponding to the supplement concept by using the concept included in the mobile ontology as the input variable of the web API.

The semantic searching unit 200 may connect the concept, which becomes the input variable of the web API, with the supplement concept through the connection edge and add the concept to the response graph.

FIG. 8 is a diagram illustrating a decision rule for applying a web API according to the present invention.

As illustrated in FIG. 8, there is an order of a priority for obtaining a parameter, and first, it is confirmed whether a query contains context, and as a result of the confirmation, when the query contains the context, context data obtained from the query is used, but when the query does not contain the context, it may be confirmed whether the search result contains the context.

As a result of the confirmation, when the search result contains the context, context data obtained from the search result is used, but when the search result does not contain the context, context data obtained from a device may be used.

FIG. 9 is a detailed block diagram of the semantic searching unit 200.

As illustrated in FIG. 9, the semantic searching unit 200 may include a query organizing unit 210, a response graph generating unit 220, and a local data searching unit 230.

Here, each operation of the query organizing unit 210, the response graph generating unit 220, and the local data searching unit 230 may be identically performed to each of the first to third detailed operations of the semantic searching unit 200 described in detail with reference to FIGS. 1 to 7. Accordingly, hereinafter, the overlapping part will be omitted and each operation of the query organizing unit 210, the response graph generating unit 220, and the local data searching unit 230 will be briefly described.

The query organizing unit 210 receives a search query, analyzes a structure of the search query, and generates a keyword graph, in which keywords included in the search query are connected.

The response graph generating unit 220 searches for the keywords included in the keyword graph in the mobile ontology and generates a response graph corresponding to the keyword graph.

The local data searching unit 230 searches for data corresponding to the search query in the local database 10 by using the response graph.

FIG. 10 is a block diagram of a mobile search device according to another exemplary embodiment of the present invention.

As illustrated in FIG. 10, the mobile search device according to the present invention may include a query organizing unit 210, a response graph generating unit 220, a local data searching unit 230, and a web searching unit 240.

Here, each operation of the query organizing unit 210, the response graph generating unit 220, and the local data searching unit 230 of the mobile search device according to the present invention may be identically performed to each of the first to third detailed operations of the semantic searching unit 200 described in detail with reference to FIGS. 1 to 7. Accordingly, hereinafter, the overlapping part will be omitted and each operation of the query organizing unit 210, the response graph generating unit 220, and the local data searching unit 230 will be briefly described.

The mobile search device according to the present invention performs a search in the local database 10.

The query organizing unit 210 receives a search query, analyzes a structure of the search query, and generates a keyword graph, in which keywords included in the search query are connected.

The response graph generating unit 220 searches for the keywords included in the keyword graph in the mobile ontology for the data stored in the local database 10 and generates a response graph corresponding to the keyword graph.

The local data searching unit 230 searches for data corresponding to the search query in the local database 10 by using the response graph.

Here, the mobile ontology includes concepts, which are abstract concepts for the data stored in the local database 10, and connection edges, which connect the concepts by using the concepts as respective nodes, and the concepts connected by one connection edge are a superordinate concept representing a higher concept or a subordinate concept representing a lower concept according to the superordinate and subordinate relationship of the concepts therebetween.

The query organizing unit 210 may extract the keywords from words included in the search query by analyzing a structure of the received search query, and classify the extracted keywords into any one of an object keyword representing a search object of the search query, a relationship keyword representing a relationship of the search query, and an information keyword representing information of the search query, and generate the keyword graph, in which the keywords are connected.

The response graph generating unit 220 may select the concepts corresponding to the keywords by searching for the keywords included in the keyword graph in the mobile ontology, and generate the response graph by connecting the selected concepts.

Here, the response graph generating unit 220 may generate the response graph by, when the keyword corresponds to the object keyword, selecting the concept corresponding to the keyword in the mobile ontology and setting the selected concept as a start node of the response graph, by, when the keyword corresponds to the relationship keyword, selecting the connection edge corresponding to the keyword from the connection edges, which are included in a subordinate level of the concept set as the start node of the response graph, in the mobile ontology and adding the selected connection edge to the response graph as an edge, and by, when the keyword corresponds to the information keyword, selecting the concept corresponding to the keyword from the concepts, which are included in a subordinate level of the connection edge added to the response graph as the edge, in the mobile ontology and adding the selected concept to the response graph as a node.

The local data searching unit 230 may generate an SQL query corresponding to the response graph, and search for and obtain data corresponding to the response graph in the local database 10 by executing the generated SQL query.

The mobile search device may further include a web searching unit 240, which connects the start node of the response graph with a supplement concept through the connection edge, and searches for data corresponding to the supplement concept in an external web connected with the mobile search device by using a web API 30 and obtains the data.

FIG. 11 is a flowchart of a mobile search method according to yet another exemplary embodiment of the present invention.

The mobile search method according to the present invention may include a query organizing step S210, a response graph generating step S220, and a local data searching step S230.

Here, each operation of the query organizing step S210, the response graph generating step S220, and the local data searching step S230 of the mobile search method according to the present invention may be identically performed to each of the detailed operations of the semantic searching unit 200 described in detail with reference to FIGS. 1 to 7. Accordingly, hereinafter, the overlapping part will be omitted and each operation of the query organizing step S210, the response graph generating step S220, and the local data searching step S230 will be briefly described.

The mobile search method according to the present invention is a method of performing a search in the local database 10.

In the query organizing step S210, a search query is received, a structure of the search query is analyzed, and a keyword graph, in which keywords included in the search query are connected, is generated.

In the response graph generating step S220, the keywords included in the keyword graph are searched in the mobile ontology for the data stored in the local database 10 and a response graph corresponding to the keyword graph is generated.

In the searching step S230, data corresponding to the search query is searched in the local database 10 by using the response graph.

Here, the mobile ontology includes concepts, which are abstract concepts for the data stored in the local database 10 and connection edges, which connect the concepts by using the concepts as respective nodes, and the concepts connected by one connection edge are a superordinate concept representing a higher concept or a subordinate concept representing a lower concept according to the superordinate and subordinate relationship of the concepts therebetween.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the technology to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the technology. Many changes, modifications, variations and other uses and applications of the present construction will, however, become apparent to those skilled in the technology after considering the specification and the accompanying drawings. All such changes, modifications, variations and other uses and applications which do not depart from the spirit and scope of the invention are deemed to be covered by the invention which is limited only by the claims which follow.

What is claimed is:

1. A search apparatus using a mobile terminal, the search apparatus comprising:
    an ontology managing unit configured to manage ontology of data searchable by the mobile terminal; and
    a semantic searching unit configured to receive a search query, generate a keyword graph, in which keywords included in the search query are connected, by analyzing a structure of the search query, generate a response graph corresponding to the keyword graph by searching for the keyword included in the keyword graph in the ontology, and search for data corresponding to the search query in a local database by using the response graph,
    wherein the semantic searching unit extracts the keywords from words included in the search query by analyzing a structure of the received search query, and classifies the extracted keywords into any one of an object keyword representing a search object of the search query, a relationship keyword representing a relationship of the search query, and an information keyword representing information of the search query, and generates the keyword graph, in which the keywords are connected, and
    wherein when the semantic searching unit generates one or more response graphs, the semantic searching unit calculates a score by using similarity or a correlation between each response graph and the information keyword included in the keyword graph and selects the response graph having the highest calculated score as a final response graph, and when the semantic searching unit generates one response graph, the semantic searching unit selects the response graph as the final response graph.

2. The search apparatus of claim 1, wherein the ontology includes concepts, which are abstract concepts for the data stored in the local database, and connection edges, which connect the concepts with each other by using the concepts as nodes, and
    the concepts connected by one connection edge are superordinate concepts representing a higher concept or subordinate concepts representing a lower concept according to a superordinate and subordinate relationship of the concepts therebetween.

3. The search apparatus of claim 2, wherein the keyword graph has the object keyword as a start node and is a graph, in which the relationship keyword node and the information keyword node are connected.

4. The search apparatus of claim 2, wherein the semantic searching unit selects the concepts corresponding to the keywords by searching for the keywords included in the keyword graph in the ontology, and generates the response graph by connecting the selected concepts.

5. The search apparatus of claim 4, wherein the semantic searching unit generates the response graph by, when the keyword corresponds to the object keyword, selecting the concept corresponding to the keyword in the ontology and setting the selected concept as a start node of the response graph, by, when the keyword corresponds to the relationship keyword, selecting the connection edge corresponding to the keyword from the connection edges included in a subordinate level of the concept set as the start node of the response graph in the mobile ontology and adding the selected connection edge to the response graph as an edge, and by, when the keyword corresponds to the information keyword, selecting the concept corresponding to the keyword from the concepts, which are included in a subordinate level of the connection edge added to the response graph as the edge, in the ontology and adding the selected concept to the response graph as a node.

6. The search apparatus of claim 5, wherein when the semantic searching unit selects the connection edge corresponding to the keyword in the ontology in the case where the keyword corresponds to the relationship keyword, the semantic searching unit selects the connection edge having a synonym relationship with the keyword as the connection edge corresponding to the keyword.

7. The search apparatus of claim 5, wherein when the semantic searching unit selects the concept corresponding to the keyword in the ontology in the case where the keyword corresponds to the information keyword, the semantic searching unit selects the concept as the concept corresponding to the keyword when data including the keyword as a partial structure exists in the data of the local database corresponding to the concept.

8. The search apparatus of claim 5, wherein the semantic searching unit connects the start node of the response graph with a supplement concept through the connection edge, and searches for data corresponding to the supplement concept in an external web connected with the semantic searching unit by using a web application program interface (API), and obtains the data.

9. The search apparatus of claim 8, wherein the semantic searching unit searches for the data corresponding to the supplement concept by using the concept included in the ontology as an input variable of the web API, and connects the concept, which becomes the input variable of the web API, with the supplement concept through the connection edge and adds the concept to the response graph.

10. The search apparatus of claim 4, wherein the semantic searching unit calculates the score by weight-summing the similarity and the correlation.

11. The search apparatus of claim 4, wherein the similarity is a value obtained by measuring character string similarity between the information keyword included in the keyword graph and the data of the local database corresponding to the concept of the response graph corresponding to the information keyword, and the correlation is a value obtained by calculating a degree, by which the data corresponding to the information keyword occupies a position in a field.

12. The search apparatus of claim 4, wherein the semantic searching unit generates a structured query language (SQL) query corresponding to the final response graph, and searches for data corresponding to the final response graph in the local database by executing the generated SQL query, and obtains the data, and the SQL query includes sub-SQL queries having an inclusion relationship with each other.

13. A search apparatus using a mobile terminal, the search apparatus comprising:

a query organizing unit configured to receive a search query, analyze a structure of the search query, and generate a keyword graph, in which keywords included in the search query are connected;

a response graph generating unit configured to search for the keywords included in the keyword graph in the ontology for data stored in a local database and generate a response graph corresponding to the keyword graph; and a local data searching unit configured to search for data corresponding to the search query in the local database by using the response graph, wherein the query organizing unit extracts the keywords from words included in the search query by analyzing a structure of the received search query, and classifies the extracted keywords into any one of an object keyword representing a search object of the search query, a relationship keyword representing a relationship of the search query, and an information keyword representing information of the search query, and generates the keyword graph, in which the keywords are connected, wherein when the response graph generating unit generates one or more response graphs, the response graph generating unit calculates a score by using similarity or a correlation between each response graph and the information keyword included in the keyword graph and selects the response graph having the highest calculated score as a final response graph, and when the response graph generating unit generates one response graph, the response graph generating unit selects the response graph as the final response graph.

14. The search apparatus of claim 13, further comprising:

a web searching unit configured to connect a start node of the response graph with a supplement concept through the connection edge, and search for data corresponding to the supplement concept in an external web connected with the search apparatus using the mobile terminal by using a web application program interface (API), and obtain the data.

15. A search method using a mobile terminal, the search method comprising:

a query organizing step of receiving a search query, analyzing a structure of the search query, and generating a keyword graph, in which keywords included in the search query are connected;

a response graph generating step of searching for the keywords included in the keyword graph in the ontology for data stored in a local database and generating a response graph corresponding to the keyword graph; and a local data searching step of searching for data corresponding to the search query in the local database by using the response graph, wherein the query organizing step comprises extracting the keywords from words included in the search query by analyzing a structure of the received search query, and classifying the extracted keywords into any one of an object keyword representing a search object of the search query, a relationship keyword representing a relationship of the search query, and an information keyword representing information of the search query, and generating the keyword graph, in which the keywords are connected, wherein the response graph generating step comprises, when one or more response graphs are generated, calculating a score by using similarity or a correlation between each response graph and the information keyword included in the keyword graph and selecting the response graph having the highest calculated score as a final response graph, and one response graph generated, selecting the response graph as the final response graph.

* * * * *